United States Patent
O'Rourke et al.

(10) Patent No.: US 7,234,292 B1
(45) Date of Patent: Jun. 26, 2007

(54) CABLE AND HOSE CARRIER SUPPORT SYSTEM

(75) Inventors: James D. O'Rourke, Pewaukee, WI (US); Mark A. Zanolla, Hobart, IN (US)

(73) Assignee: A&A Manufacturing Co., Inc., New Berlin, WI (US)

( * ) Notice: Subject to any disclaimer, the term of this patent is extended or adjusted under 35 U.S.C. 154(b) by 351 days.

(21) Appl. No.: 10/940,033

(22) Filed: Sep. 14, 2004

Related U.S. Application Data

(60) Provisional application No. 60/519,764, filed on Nov. 13, 2003.

(51) Int. Cl.
*F16L 3/01* (2006.01)

(52) U.S. Cl. .......................................... 59/78.1; 248/49

(58) Field of Classification Search ................. 59/78.1; 248/49, 51
See application file for complete search history.

(56) References Cited

U.S. PATENT DOCUMENTS

| | | | |
|---|---|---|---|
| 3,330,105 A | | 7/1967 | Weber |
| 3,590,854 A | * | 7/1971 | Cork ..................... 137/355.16 |
| 4,129,277 A | * | 12/1978 | Tenniswood ................. 248/51 |
| 4,392,344 A | | 7/1983 | Gordon et al. |
| 4,462,565 A | * | 7/1984 | Johnson ....................... 248/51 |
| 4,499,720 A | | 2/1985 | Klein |
| 4,600,817 A | * | 7/1986 | Hackenberg .............. 191/12 C |
| 4,858,424 A | | 8/1989 | Loding et al. |
| 5,016,841 A | | 5/1991 | Schumann et al. |
| 5,108,350 A | | 4/1992 | Szpakowski |
| 5,184,454 A | | 2/1993 | Klein et al. |
| 5,649,415 A | | 7/1997 | Pea |
| 6,107,565 A | | 8/2000 | O'Rourke |
| 6,349,534 B1 | | 2/2002 | Zanolla et al. |

OTHER PUBLICATIONS

Installation and Servicing Guide Type 225 Powertrak Carriage Standard and Opposed System, PN 044534.a, Gleason Reel Corp., Mayville, Wisconsin, USA.

KabelSchlepp Goes the Distance: Plastic cable & hose carriers with carriage system for travel lengths up to 1000 m, KabelSchlepp America, Inc., Milwaukee, Wisconsin, USA.

Rolling Carriage Systems Extend Range of Steel Cable and Hose Carrier Applications, KSA-115, KabelSchlepp America, Inc., Milwaukee, Wisconsin, USA.

* cited by examiner

*Primary Examiner*—Derris H. Banks
*Assistant Examiner*—Debra M Wolfe
(74) *Attorney, Agent, or Firm*—Andrus, Sceales, Starke & Sawall, LLP

(57) ABSTRACT

A cable and hose carrier support framework or walker is engaged by and independently driven by the carrier at an arcuate bend thereof for transferring a portion of a carrier load from the bend to a support surface beneath the lower run of the carrier in a manner which will prevent cogging and undue wear of the carrier.

18 Claims, 5 Drawing Sheets

CABLE AND HOSE CARRIER SUPPORT SYSTEM

CROSS REFERENCE TO RELATED APPLICATION

This application is based on and claims priority from U.S. Provisional Patent Application Ser. No. 60/519,764 filed Nov. 13, 2003.

FIELD OF THE INVENTION

The present invention relates generally to pivoted chain link types of movable cable and hose carriers for surrounding, carrying and protecting flexible conduits for supplying air, hydraulic fluid and electricity. More particularly, the present invention pertains to a support system or walker which is driven by the carrier and used to reduce vibration and wear during movement thereof.

BACKGROUND OF THE INVENTION

Plastic and metal cable and hose carriers for supporting cables, hoses and other flexible conduits extending from one location to another and movable in a relatively straight line are well known. Commonly, cable and hose carriers are constructed of a pair of parallel chains of links interconnected end-to-end which permit pivoting of the links in only one direction from a straight or slightly cambered extended position. The links may be designed to have limiting members of differing size and configurations to create carriers with a variety of pivot radii. A set of crossbars laterally unite the chain pair to define a cargo space in which the cables, hoses and other flexible conduits are carried.

Each link is typically formed with an arcuate or peanut-shaped slot on one end and a stop post on an opposed end. Adjacent links are pivotally connected together such that the stop post on one link will travel back and forth relative to the ends on the arcuate slot in another link. This occurs during relative pivotal movement of the adjacent links as the carrier moves through an arcuate bend between a lower run connected to a fixed point and an upper run joined to a movable member, such as a machine tool or crane. The arrangement of the arcuate slots and the stop posts is such that the links can only pivot in one direction from a straight line. As a result, when the links reach the horizontal position in the upper run, they support themselves in a straight line because they cannot pivot in the other direction.

A problem occurs in heavily weighted plastic and metal carriers moving at higher speeds during which the stop posts on the links tend to hammer or impact against the ends of the arcuate slots formed in the links. Since the link sections are straight segments that rotate through an arc, a cogging effect occurs as the carrier travels through its intended motion. As the load mass is transferred from one link to another at the transition point from the arcuate bend to the straight upper run, the impact of the stop posts on the ends of the arcuate slots in the links leads to vibration and accelerated wear and deformation of the links. Prolonged wear and deformation of the links can lead to carrier sag that negatively affects carrier performance and ultimately failure of the system. The problem is intensified when the carrier is fully extended. In this position, one half of the load is borne at the distal end of the upper run attached to the movable machine tool, crane or the like. The remaining half of the load is directed downwardly at the proximal end of the upper run leading into the arcuate bend. Because the load is unsupported as the carrier moves through the bend, the cogging effect is exaggerated where increased and severe wear of the links is incurred.

The prior art includes rolling carriage support systems used in high speed, extended carrier travel. Such systems require various support beams or channels, and a cable arrangement attached between movable and fixed ends of the carrier. These prior art carriage systems however, are primarily concerned with preserving high speed, long distance travel of the carrier.

Accordingly, it is desirable to provide a support system for reducing vibration and preventing impacting of the stop posts with the ends of the arcuate slots in the pivotally interconnected links of a cable and hose carrier so as to allow use of the carrier in faster or more sensitive applications where steel cable carrier typically would be limited.

SUMMARY OF THE INVENTION

It is a general object of the present invention to provide an anti-cogging cable and hose carrier support system which overcomes the aforementioned problems of an unsupported heavily weighted carrier at high speeds to reduce wear of the carrier links.

It is one object of the present invention to provide a cable and hose carrier support system which bears the load of the carrier at its arcuate bend.

It is also an object of the present invention to provide a cable and hose carrier support framework which is driven exclusively by the carrier without any need for auxiliary driving equipment i.e. cable.

It is a further object of the present invention to provide a cable and hose carrier support system which includes a rolling framework for supporting and guiding the links of the carrier through the arcuate bend thereof, and for transferring the load at the transition between the arcuate bend and straight upper run of the carrier.

It is an additional object of the present invention to provide a cable and hose carrier support system designed as a function of the particular bend radius of the carrier.

In one aspect of the invention, the support framework is engaged and independently driven by a cable and hose carrier at an arcuate bend thereof for transferring a portion of the carrier load from the bend to a support surface beneath a lower run of the carrier in an effort to prevent cogging and undue wear of the carrier. The support framework takes the form of a walker having a load transferring structure and various guide structure for directing the carrier through the bend.

In one version, the framework includes a pair of spaced apart channels for receiving guide rollers rotatably mounted on each side of the carrier. The bend radius of each channel is greater than the bend radius of the carrier.

In another version, the framework employs multiple sets of carrier-engaging guide rollers rotatably mounted thereon with certain of the rollers being strategically located forward of the carrier bend radius.

In yet another version, the framework supports a cylindrical drum having a 180 degree portion around which the carrier is wrapped. The diameter of the drum is designed to be larger than the radius of the carrier bend.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION

Figure 1:
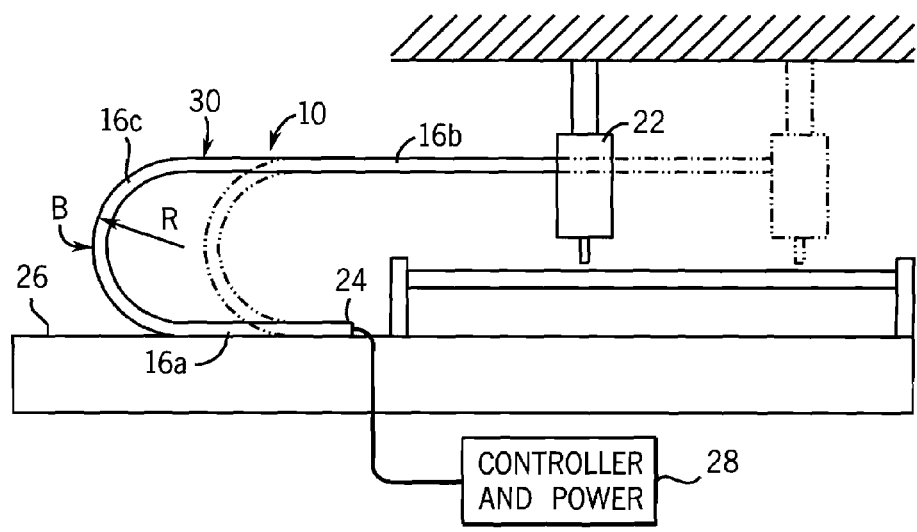
FIG. 1 is an elevational view of a conventional cable and hose carrier with an alternative working position of the carrier shown in phantom lines.
Figure 2:
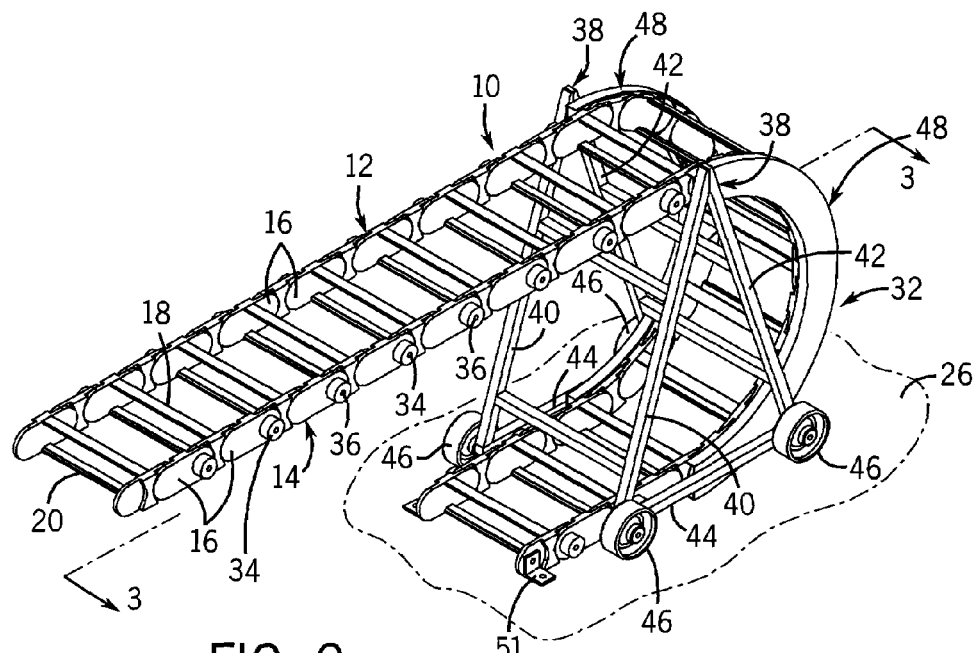
FIG. 2 is a perspective view of a cable and hose carrier support system embodying the present invention.

Referring now to FIG. 1, a conventional, movable cable and hose carrier 10 for guiding and protecting flexible power conduits (not shown) is constructed of a pair of parallel chains 12, 14 (FIG. 2) of identical links 16 interconnected end-to-end so that the links will have limited pivotal movement. The links 16 are coupled together laterally by upper crossbars 18 and lower crossbars 20 between which a cargo space is defined for carrying the cables, hoses and other flexible conduits. The links 16 are joined between a reciprocable member 22, such as a machine tool or crane, and a fixed point 24 anchored on a stationary support surface 26. It should be understood that fixed point 24 is in communication with a suitable controller and power unit 28 for controlling and supplying hydraulic, pneumatic and/or electrical power to the movable member 22.

As shown, the carrier 10 contains an arcuate portion or 180 degree bend B. A lower run 16a of the carrier links 16 extends horizontally along support surface 26 to the left of FIG. 1, and an upper run 16b of links 16 extends in the opposite direction with several intermediate links 16c pivoted to each other to provide the desired bend B. The bend radius R constitutes a carrier parameter chosen by the designer for a given power supply application as is well known in dependence on the dynamic bending characteristic of the flexible power conduits supported by the carrier 10, and such characteristics such as the carrier strength and pivot range of the carrier links 16, and other factors. The bend B assumes its radius due to the weight of the upper run 16b bearing downwardly taken at 30. When the reciprocable member 22 is moved from the position shown in full lines to that shown in phantom lines in FIG. 1, the curvature provided by the intermediate links 16c remains constant, and for each link 16 on the lower run 16a which is lifted upwardly from the support surface 26 by the reciprocating motion, an additional link 16 is added to the upper run 16b, and vice versa. As explained in more detail in the Background of the Invention, certain heavier carriers 10, particularly those in high speed applications, experience vibration, impact and cogging. Because the portion of the carrier load is unsupported as the carrier 10 moves through the bend B, the cogging leads to severe wear of the links 16 and negatively affects the operation of the carrier 10.

The present invention remedies these problems by providing a support framework or walker 32 which is engaged by and independently driven by the carrier 10 at the arcuate bend B for transferring a portion of the carrier load from the bend B to the support surface 26 beneath the lower run 16a of the carrier 10. The support system 32 is designed to prevent impacting between the stop posts and the ends of the arcuate slots formed in the carrier links 16.

Referring now to FIGS. 2-6, the carrier 10 is provided with a set of guide rollers 34 located in spaced relationship outside the links 16 on each chain 12, 14, and rotatably mounted on pins 36 which may serve as pivot axes for the links 16. Support framework or walker 32 includes a pair of identical, spaced apart, triangularly-shaped framework sections 38 disposed on opposite sides of the carrier 10 in the vicinity of the arcuate bend B. Each framework section 38 has a pair of side members 40, 42 having upper ends joined together, and spaced apart lower ends connected together by a bottom member 44 which lies generally parallel to the support surface 26. The junction between each of the lower ends and a respective end of the bottom member 44 is provided with a support wheel 46 which rolls along the support surface 26. Crossbraces 47 laterally interconnect the frame sections 38 together to provide rigidity and stability. Welded to the inside surface of each framework section 38 is a C-shaped channel 48 which extends generally from the joined upper ends of a framework section 38 to a mid portion of the connecting bottom member 44. As seen best in FIGS. 5 and 6, each channel 48 is identical and has a top wall 48a, a bottom wall 48b and an outer wall 48c which together define an oversized cavity 450 receiving one set of guide rollers 34 therein. Each channel 48 is particularly formed with a bend radius which is slightly larger than the bend radius R of the carrier 10 for a purpose to be described and appreciated below.

Figure 3:
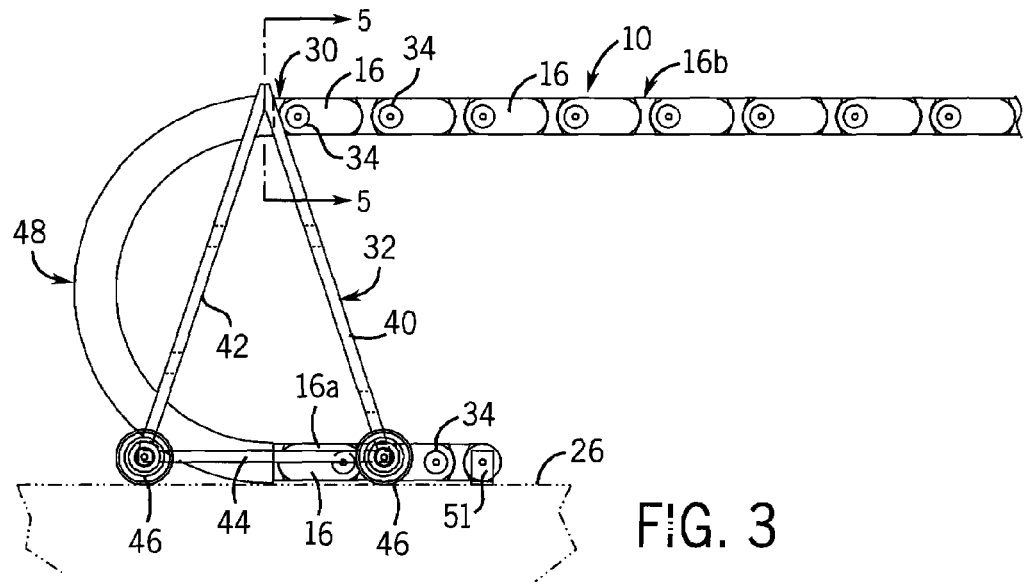
FIG. 3 is a rear elevational view of the support system taken on line 3-3 of FIG. 2.
Figure 4:
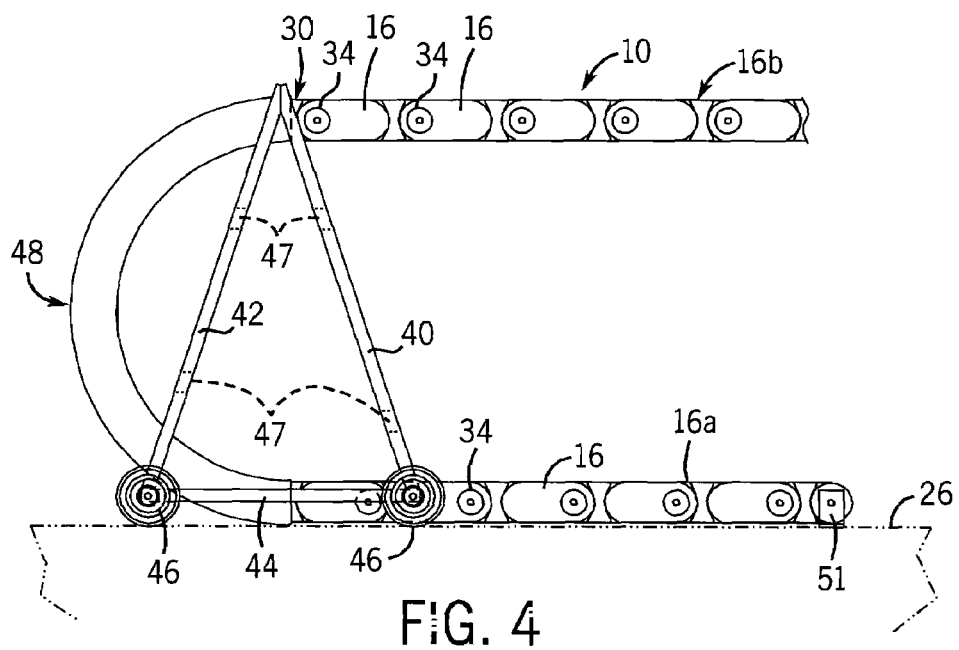
FIG. 4 is a view like FIG. 3 showing the support framework driven to the left by the cable and hose carrier.
Figure 5:
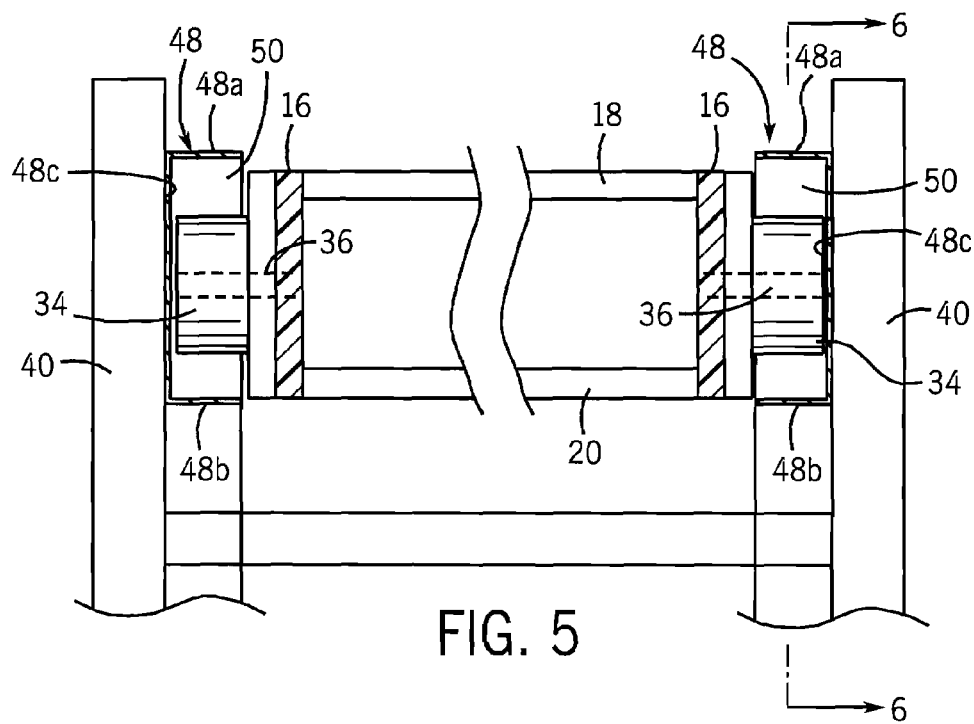
FIG. 5 is an enlarged sectional view taken on line 5-5 of FIG. 3.
Figure 6:
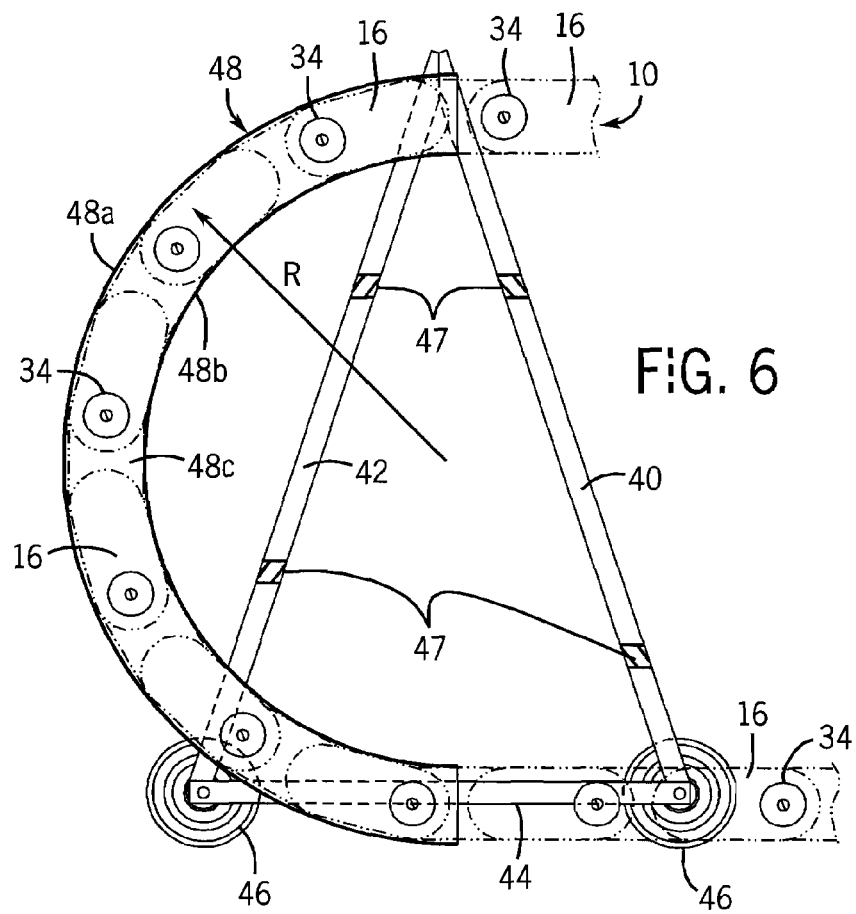
FIG. 6 is an enlarged sectional view taken on line 6-6 of FIG. 5.

In use, before being fixed by brackets 51 to support surface, the carrier 10 is threaded or passed through the walker 32 such that the guide rollers 34 are received in the channels 48. FIG. 3 shows the walker 32 supporting the carrier 10 at an extended travel position corresponding to the phantom lines of FIG. 1. When the movable member 22 is accelerated to the left, the guide rollers 34 of the upper run 16b enter the mouths of channels 48 and are pushed therethrough with the intermediate links 16c moving outside the channels 48 as seen best in FIG. 2. Because the guide wheels 34 are contained in the channels 48, the guide wheels 34 drive the walker 32 to the left as seen in FIG. 4 with the four support wheels 46 rolling upon the support surface 26. Links 16 exiting the channels 48 and defining the lower run 16a are progressively deposited upon the support surface 26.

It is important to understand that because of the bend radius of the channels 48, the walker 32 bears and supports the portion of the carrier load at the beginning 30 of the carrier bend B which load previously has been unsupported throughout the bend B and caused the above discussed problems. With the walker 32, the carrier load portion at 30 is transferred directly downwardly through the framework sections 38 to the support surface 26 so that cogging and wear on the carrier 10 is minimized. It is also to be noted that the carrier 10 drives the walker 32 without the need for any cables attached to the movable member 14 or any support trays or beams as required in prior art carriage systems.

Figure 7:
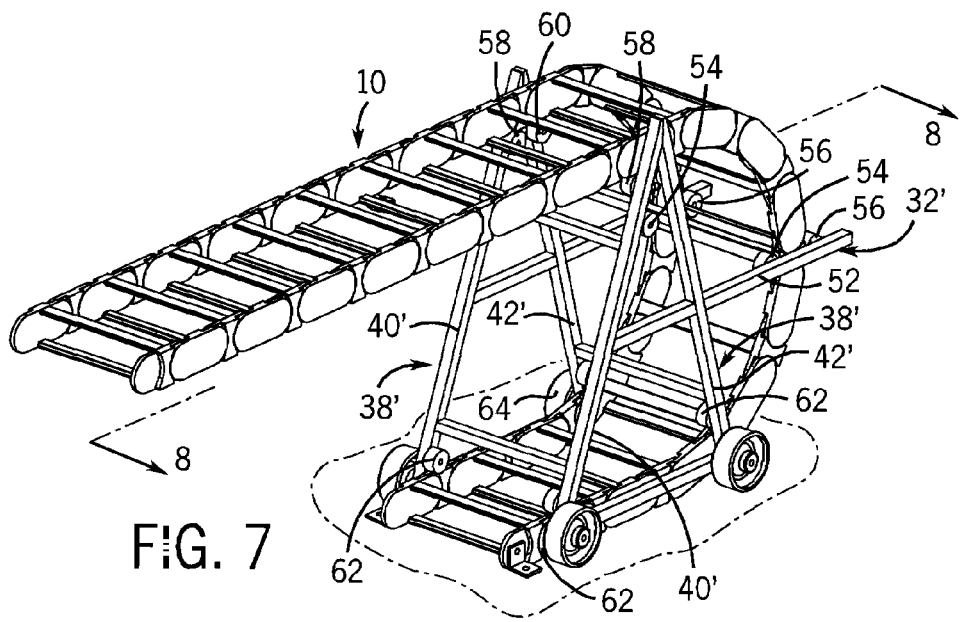
FIG. 7 is a perspective view of a first alternative embodiment of the support framework.
Figure 8:
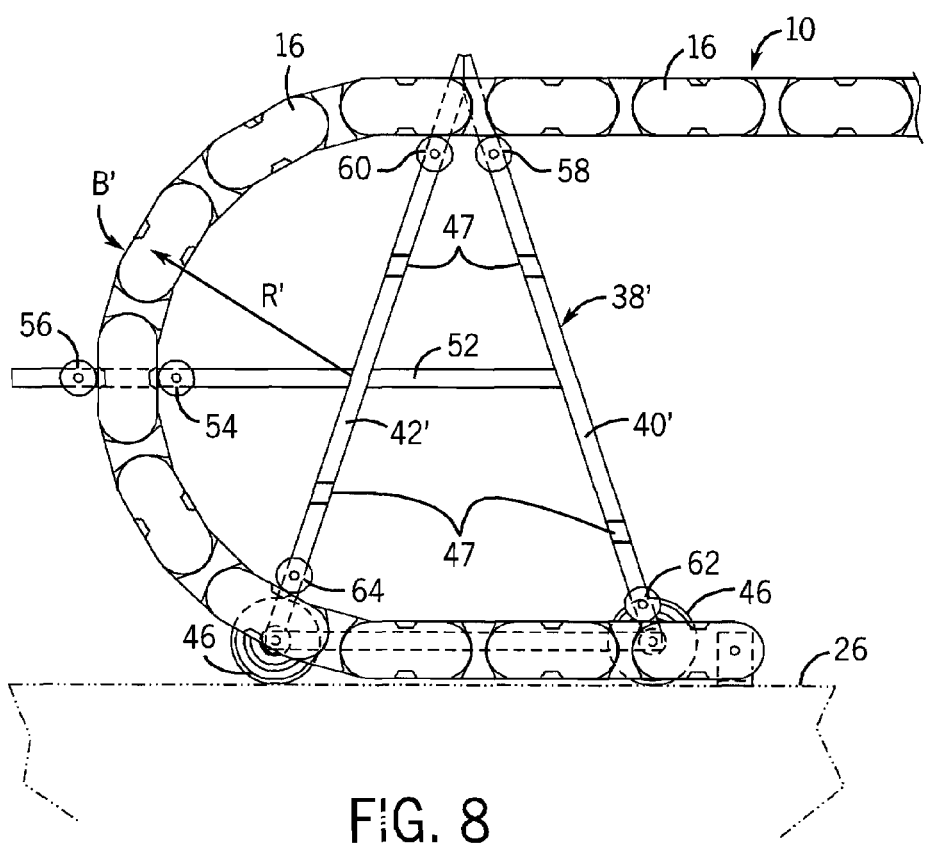
FIG. 8 is a view of the support framework taken on line 8-8 of FIG. 7.

Referring to FIGS. 7 and 8, there is shown a first alternative embodiment of a support framework or walker 32+ which modifies support framework 32 as follows. Each framework section 38' includes a horizontally extending beam 52 which is attached to midportions of the side members 40', 42' and runs rearwardly thereof. The rear portion of each beam 52 is provided with a pair of spaced apart, rotatably mounted guide rollers 54, 56 which face inwardly. The top ends of side members 40', 42' on framework sections 38' carry another pair of rotatably mounted guide rollers 58, 60 which face inwardly. The bottom ends of side members 40', 42' on framework sections 38' are equipped with yet another pair of rotatably mounted guide rollers 62, 64 which face inwardly. In this version, the guide rollers 60 are positioned at a point which is at least equal to or, in this case, forward of the carrier bend radius R' centerline.

In use, the carrier 10 is passed over the top of the guide rollers 58, 60, between the guide rollers 54, 56 and then under the guide rollers 62, 64. Due to the position of the guide rollers 58, 60 being forward of the bend radius R', the carrier load portion entering the bend B' is transferred downwardly through the frame sections 38' to the support surface 26 so as to markedly reduce cogging.

Figure 9:
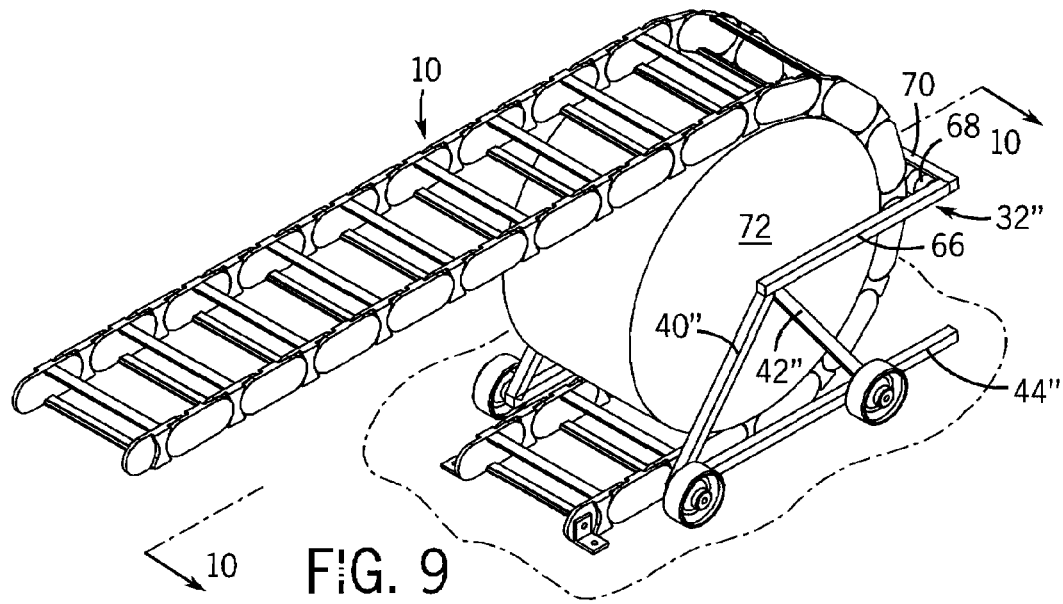
FIG. 9 is a perspective view of a second alternative embodiment of the support framework.
Figure 10:
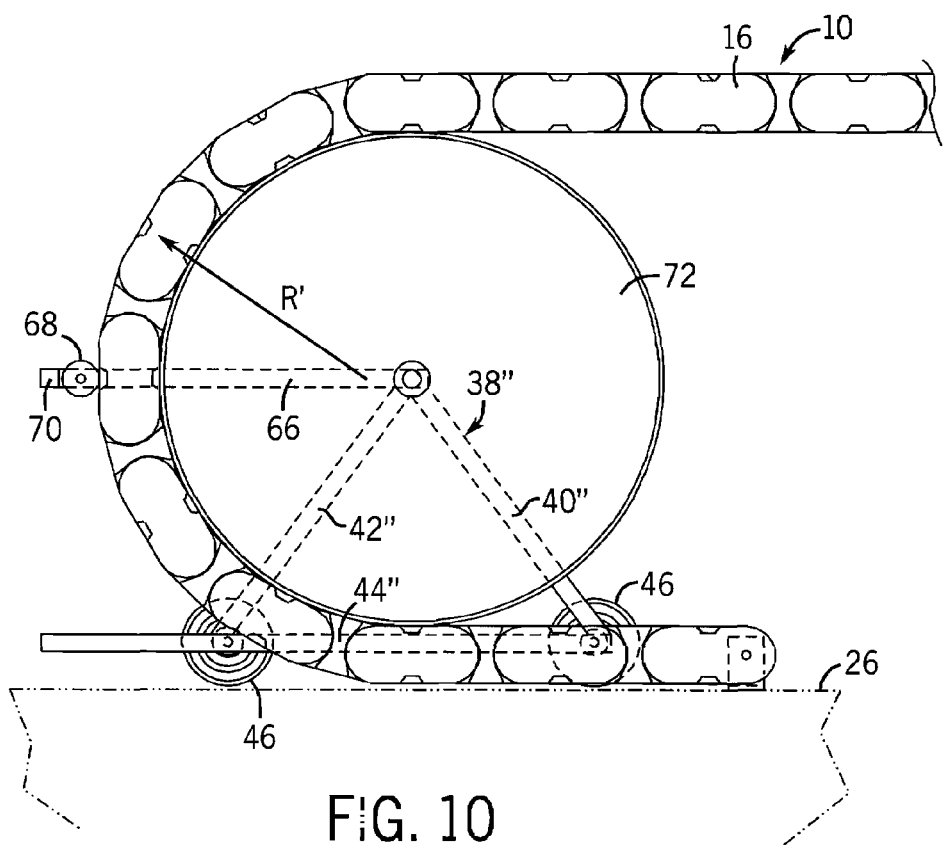
FIG. 10 is a view taken on line 10-10 of FIG. 9.

Referring to FIGS. 9 and 10, there is shown a second alternative embodiment of a support framework or walker 32". In this version, the framework sections 38" are reduced in size and include extended bottom portions 44". Each framework section 38" also includes a horizontally and rearwardly extending beam 66 which has a front end attached to the top junctions of side members 40", 42", and a back end provided with an inwardly facing, rotatably mounted guide roller 68. The back ends of the beam 66 are interconnected by a tie bar 70. A cylindrical drum 72 is rotatably mounted on each side thereof to the junctions between the side members 40", 42" and the beams 66. Here, the drum diameter is chosen to be greater than the bend radius R".

In use, the carrier 10 is wound around about 180 degrees of the drum periphery while passing in front of guide rollers 68. Due to the diameter of the drum 72 relative to the bend radius R", the carrier load portion at 30 will be transferred through drum 72 and framework sections 38" to the support surface 26 to again substantially prevent cogging.

While the invention has been described with reference to a preferred embodiment, those skilled in the art will appreciate that certain substitutions, alterations and omissions may be made without departing from the spirit thereof. Accordingly, the foregoing description is meant to be exemplary only and should not be deemed limitative on the scope of the invention set forth with the following claims.

We claim:

1. A cable and hose carrier support system comprising:
   a cable and hose carrier having a plurality of chain links pivotally connected together for movement through an arcuate bend between a lower run connected to a fixed point and an upper run joined to a movable member, the arcuate bend having a bend radius; and
   a movable framework engaged and exclusively driven by the cable and hose carrier at the arcuate bend thereof for transferring a portion of a carrier load from the arcuate bend to a support surface underlying the lower run of the carrier so as to prevent undue wear of the carrier, wherein the movable framework includes a pair of identical, spaced apart, triangularly-shaped framework sections, and wherein each of the framework sections includes a pair of side members having upper ends joined together and spaced apart lower ends connected together by a bottom member lying generally parallel to the support surface.

2. The support system of claim 1, wherein junctions between the lower ends of the side members and respective ends of the bottom member are provided with support wheels rollably engageable with the support surface.

3. The support system of claim 2, wherein the carrier is provided with a set of guide rollers rotatably mounted to outside surfaces of the chain links.

4. The support system of claim 3, wherein a C-shaped channel is connected to an inside surface of each framework section.

5. The support system of claim 4, wherein the C-shaped channel extends from the joined upper ends of one of the framework sections to a midportion of a bottom member.

6. The support system of claim 5, wherein the C-shaped channel defines a cavity for receiving the guide rollers.

7. The support system of claim 6, wherein the C-shaped channel is formed with a bend radius slightly larger than the bend radius of the carrier.

8. The support system of claim 1, wherein each of the framework sections includes a horizontally extending beam attached to midportions of the side members and extending rearwardly thereof.

9. The support system of claim 8, wherein a rear portion of each beam is provided with a first pair of spaced apart, rotatably mounted, inwardly facing guide rollers.

10. The support system of claim 9, wherein top ends of the side members are provided with a second pair of spaced apart, rotatably mounted, inwardly facing guide rollers.

11. The support system of claim 10, wherein the second pair of guide rollers is positioned forwardly of the bend radius centerline.

12. The support system of claim 10, wherein bottom ends of the side members are provided with a third pair of spaced apart, rotatably mounted, inwardly facing guide rollers.

13. The support system of claim 12, wherein the carrier is passed over the second pairs of guide rollers, between the first pairs of guide rollers and under the third pairs of guide rollers.

14. The support system of claim 1, wherein each of the framework sections includes a horizontally and rearwardly extending beam having a front end attached to tops of the side members, and a back end provided with an inwardly facing, rotatably mounted guide roller.

15. The support system of claim 14, wherein each back end of the beam is interconnected by a transverse tie bar.

16. The support system of claim 15, wherein a cylindrical drum is rotatably mounted on opposite sides thereof to junctions between the side members and the beams.

17. The support system of claim 16, wherein the cylindrical drum has a diameter greater than the bend radius.

18. The support system of claim 17, wherein the carrier is wound about 180 degrees of the drum and passes between the drum and the guide rollers.

* * * * *